US012782384B2

(12) United States Patent
Ito et al.

(10) Patent No.: US 12,782,384 B2
(45) Date of Patent: Nov. 3, 2026

(54) SPEED MEASUREMENT DEVICE

(71) Applicant: HITACHI CONSTRUCTION MACHINERY CO., LTD., Tokyo (JP)

(72) Inventors: Hiroki Ito, Tokyo (JP); Tien Trien Le, Tokyo (JP); Shogo Kunioka, Tokyo (JP); Tomoaki Shinpo, Tokyo (JP); Hiroshi Tsukui, Tokyo (JP)

(73) Assignee: HITACHI CONSTRUCTION MACHINERY CO., LTD., Tokyo (JP)

( * ) Notice: Subject to any disclaimer, the term of this patent is extended or adjusted under 35 U.S.C. 154(b) by 495 days.

(21) Appl. No.: 18/280,346

(22) PCT Filed: Aug. 2, 2022

(86) PCT No.: PCT/JP2022/029648
§ 371 (c)(1),
(2) Date: Sep. 5, 2023

(87) PCT Pub. No.: WO2023/021983
PCT Pub. Date: Feb. 23, 2023

(65) Prior Publication Data
US 2024/0077515 A1 Mar. 7, 2024

(30) Foreign Application Priority Data
Aug. 19, 2021 (JP) ................................ 2021-134089

(51) Int. Cl.
*G01P 21/02* (2006.01)
*G01P 7/00* (2006.01)

(52) U.S. Cl.
CPC ................ *G01P 21/02* (2013.01); *G01P 7/00* (2013.01)

(58) Field of Classification Search
CPC ...... G05B 19/0428; G05B 2219/31457; F16K 37/0083; H04L 12/66; G01P 7/00; G01P 21/02
See application file for complete search history.

(56) References Cited

U.S. PATENT DOCUMENTS

| | | | | |
|---|---|---|---|---|
| 4,633,720 | A * | 1/1987 | Dybel | G01D 1/12 702/41 |
| 2016/0076227 | A1* | 3/2016 | Hoshino | B60W 10/08 180/65.265 |
| 2020/0277751 | A1* | 9/2020 | Chiba | E02F 9/262 |
| 2020/0277757 | A1* | 9/2020 | Kurokami | E02F 9/24 |

FOREIGN PATENT DOCUMENTS

JP 1143270 A 2/1999

OTHER PUBLICATIONS

International Search Report of PCT/JP2022/029648 dated Oct. 25, 2022.

* cited by examiner

*Primary Examiner* — Jennifer Bahls
(74) *Attorney, Agent, or Firm* — MATTINGLY & MALUR, PC

(57) ABSTRACT

The purpose of the present invention is to provide a speed measurement device with which it is possible to accurately identify the highest travel speed of a work machine using the result of measurement by an acceleration sensor. The speed measurement device according to the present invention: detects, from within a record of the travel acceleration of a work machine, a change point at which the work machine transitions from an accelerating state to a steady travel state; and identifies the highest travel speed from a record of the travel speed in a period later than the change point.

15 Claims, 12 Drawing Sheets before
calibration
(raw data)

after
calibration

FIG. 7A

・state equation $$\begin{pmatrix} v_t \\ \alpha_t \end{pmatrix} = \begin{pmatrix} 1 & \Delta t \\ 0 & 1 \end{pmatrix} \begin{pmatrix} v_{t-1} \\ \alpha_{t-1} \end{pmatrix}$$

v : speed
α : acceleration
Δt : time difference

・observation equation $$\begin{pmatrix} v_t \\ \alpha_t \end{pmatrix} = \begin{pmatrix} 0 & 1 \end{pmatrix} \begin{pmatrix} v_t \\ \alpha_t \end{pmatrix}$$

SPEED MEASUREMENT DEVICE

TECHNICAL FIELD

The present disclosure relates to a speed measuring device that measures running speed of a work machine.

BACKGROUND ART

Performance measurement for work machine (e.g. constructing machine such as hydraulic excavator) is one of maintenance processes of work machine. Such performance measurement is performed for quantitatively understanding levels of functionality of each portion in the machine. For example, running performance measurement examines whether the running performance satisfies a reference value by letting the work machine to actually run a predetermined distance at maximum running speed, and by checking whether the work machine can reach the goal point within a predefined time.

A work machine may not include a speed meter as in normal cars. Thus the running speed is measured by manual operation in conventional cases. In addition, a work machine is typically configured such that it cannot run at above a predetermined maximum running speed (or within error range above or below the maximum running speed). In other words, the maximum running speed is an indicator of whether the running performance of the work machine satisfies a reference value. Therefore, in such running performance measurement, the maximum running speed of the work machine is typically measured by manual operation.

Running performance measurement is typically performed by a measurer using a stopwatch to measure the running time. In an example, if a work machine runs a 10 meters section at a maximum running speed, the running speed is identified as normal if the work machine completes the section within 6±0.6 seconds in high speed running mode, or within 10±1.0 seconds in low speed running mode. In this example, the range of normal running time is within 10% above or below the predefined value. Therefore, if the measuring accuracy for running time is not enough, an erroneous test result will be acquired. Since manual measurement includes large measuring errors, mechanical measuring means are required.

As means for mechanically measuring running speed, car speed sensor or GPS (Global Positioning System) may be assumed. However, not all work machines include car speed sensors. Thus it is necessary to additionally install such sensors, which incurs costs for the installation. GPS cannot be used in environments such as where radio waves cannot be received, and thus GPS is a sensor that highly depends on environments. In the light of above, it is desirable to use an attachable sensor that lowly depends on environments and that can be easily attached to the work machine (or that can be equipped on the work machine). Acceleration sensor is an example of desirable sensor in the light of above.

Patent Literature 1 below describes a technique for measuring speed of elevator using acceleration sensor. Patent Literature 1 describes a technical problem as: "providing a speed measuring method and a running characteristic measuring device for moving object that can acquire precise speed data and that can significantly decrease labor of maintenance workers". Patent Literature 1 also describes a technique as: "When measuring speed of elevator, a running characteristic measuring device 9 is carried by a maintenance worker A and is placed on a floor of an elevator car 1 when measuring. The running speed measuring device 9 is configured by an accelerometer, a computational controller that processes an output from the acceleration sensor, means for correcting an error, and a displayer that displays a processed result. When the elevator car 1 runs, the acceleration sensor outputs an acceleration value accordingly. The computational processor performs integration of the acceleration value, estimation on error components, and correction for removing the error, thereby it is possible to acquire precise acceleration data. Then it is possible to acquire a running curve of the elevator according to the computed result." (refer to ABSTRACT).

CITATION LIST

Patent Literature

Patent Literature 1: JPA 1999-043270

SUMMARY OF INVENTION

Technical Problem

When measuring running performance of work machine, a running time at the maximum running speed is typically measured, as mentioned above. When acquiring a maximum running speed in Patent Literature 1, it is determined as reaching the maximum running speed when an integrated acceleration reaches a maximum value. Then when reaching the maximum running speed, a measuring error or an integration error may also be increased, which may lead to identifying an erroneous maximum running speed. Even if a canceling process is introduced for such errors, it is difficult to completely remove such errors.

As other method for identifying maximum running speed, a time when the work machine is assumed to reach a maximum running speed may be empirically identified in advance, and a measured value at that time may be employed as a maximum running speed. However, temporal variation of running speed of work machine is different for each of machines or for each of workers. Thus it is necessary to previously keep a time range for some extent, and it is also necessary to identify the maximum running speed within the time range. As the time range is larger, the error of maximum running speed is larger. Accordingly, this method also may misidentify the maximum running speed.

The present disclosure is made in the light of the technical problem above. It is an objective of the present disclosure to provide a speed measuring device that can precisely identify a maximum running speed of a work machine using a measured result of an acceleration sensor.

Solution to Problem

A speed measuring device according to the present disclosure detects a change point where a work machine transits from an accelerating state into a steady running state in a history of running acceleration of the work machine. The speed measuring device then identifies a maximum running speed from the history of the running speed in a period after the change point.

Advantageous Effects of Invention

The speed measuring device according to the present disclosure can precisely identify a maximum running speed of a work machine using a measured result of an acceleration sensor.

BRIEF DESCRIPTION OF DRAWINGS

FIG. 7A is an example of Kalman filter equation used by a filtering section 124 in S105.

DESCRIPTION OF EMBODIMENTS

Embodiment 1

Figure 1:
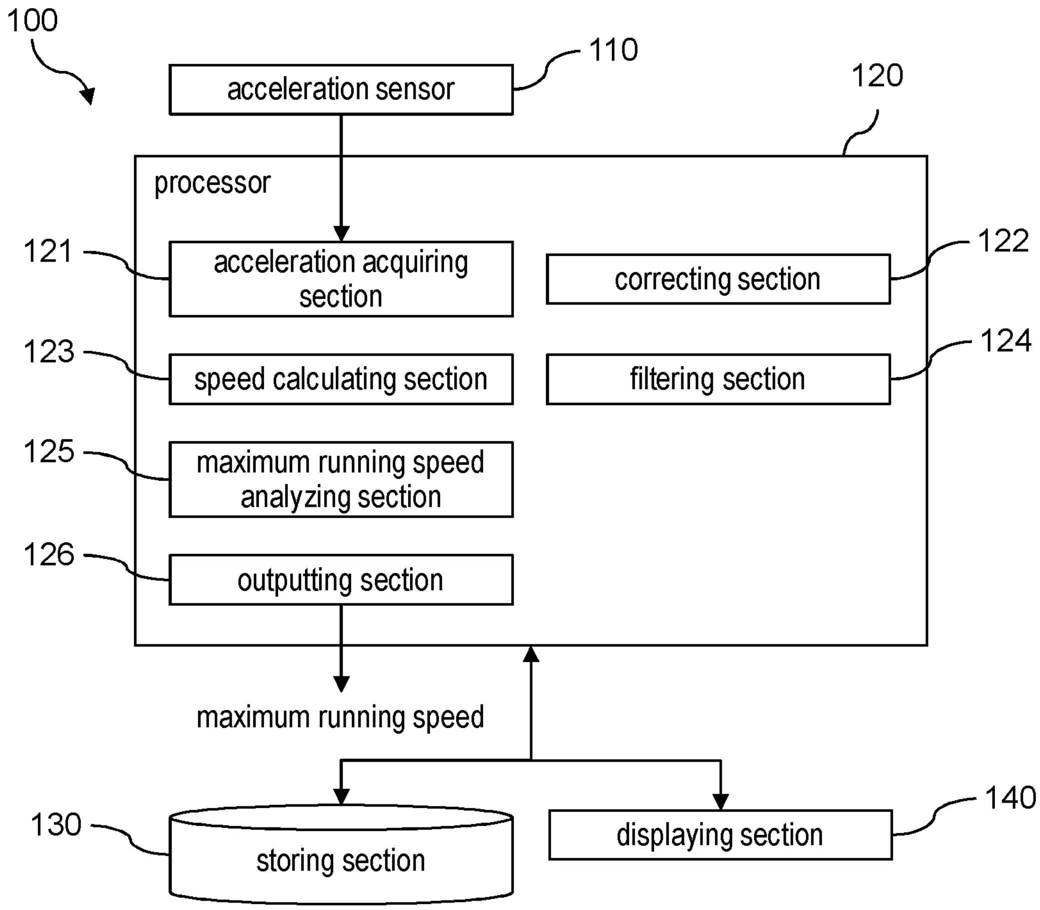
FIG. 1 is a configuration diagram of a speed measuring device 100 according to an embodiment 1.

FIG. 1 is a configuration diagram of a speed measuring device 100 according to an embodiment 1 of the present disclosure. The speed measuring device 100 is a device that measures a running speed of a work machine. The speed measuring device 100 can be configured by such as a mobile terminal that can be placed on appropriate places such as a shelf included in the work machine. The speed measuring device 100 includes an acceleration sensor 110, a processor 120, a storing section 130, and a displaying section 140.

The acceleration sensor 110 measures an acceleration applied to the speed measuring device 100. By placing the speed measuring device 100 on the work machine, the acceleration sensor 110 can indirectly measure the acceleration applied to the work machine.

The processor 120 includes an acceleration acquiring section 121, a correcting section 122, a speed calculating section 123, a filtering section 124, a maximum running speed analyzing section 125, and an outputting section 126. The processor 120 and each of functional units included in the processor 120 may be configured by hardware such as circuit device implementing functionalities of those functional units, or may be configured by software implementing functionalities of those functional units executed by processors such as CPU (Central Processing Unit). Behaviors of the processor 120 will be described later.

The storing section 130 can be configured by a storage device that stores data used by the processor 120. Examples of the data will be described later. The displaying section 140 displays a processed result by the processor 120, or displays a user interface described later.

Figure 2:
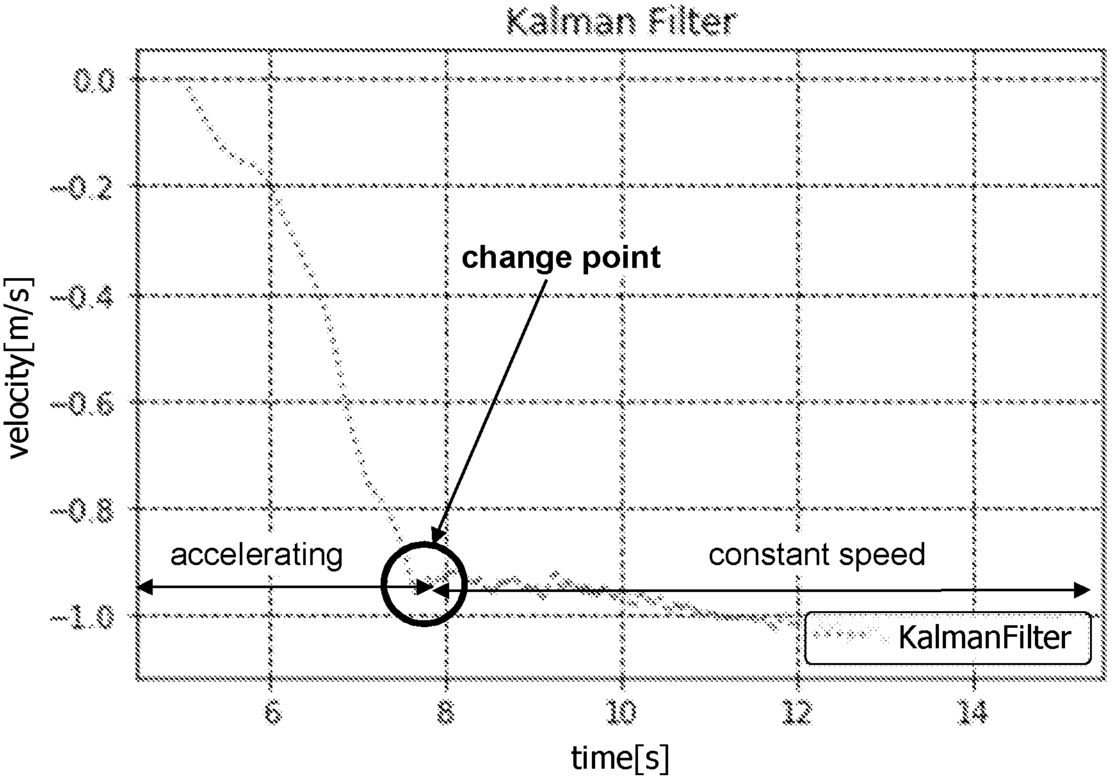
FIG. 2 is a graph that explains a determining criterion for a processor 120 to identify a maximum running speed of a work machine.

FIG. 2 is a graph that explains a determining criterion for the processor 120 to identify a maximum running speed of the work machine. The vertical axis represents a running speed of the work machine. The horizontal axis represents an elapsed time from when the work machine starts running (or the acceleration sensor 110 starts measuring). The processor 120 assumes that the work machine runs at a constant speed after reaching the maximum running speed. The processor 120 detects a change point where the work machine transits from a state of accelerating into a constant speed running state. By detecting the change point, it is assumed to precisely detect that the work machine reaches the maximum running speed, without depending on the work machine or on characteristics of workers.

Figure 3:
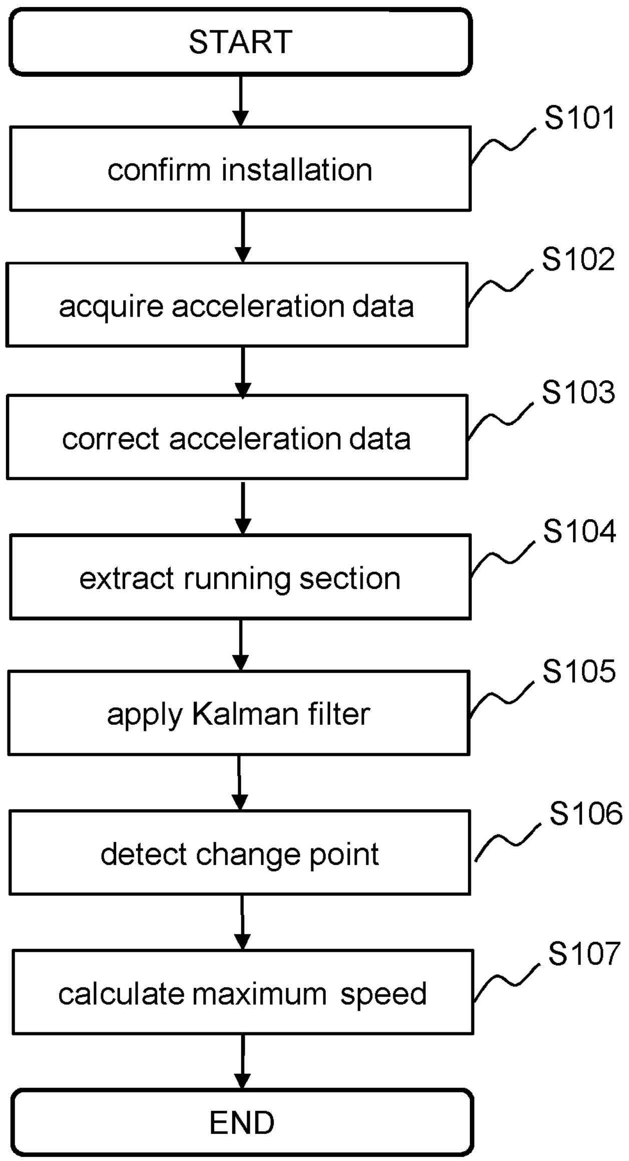
FIG. 3 is a flowchart that explains a procedure for the processor 120 to calculate a maximum running speed of a work machine.

FIG. 3 is a flowchart that explains a procedure for the processor 120 to calculate a maximum running speed of the work machine. Hereinafter, each step in FIG. 3 will be described.

(FIG. 3: Step S101)

A user places the speed measuring device 100 on an appropriate place of the work machine. The user checks whether any one of detection axes of the acceleration sensor 110 matches with the running direction of the work machine. Further, the user may check whether another detection axis of the acceleration sensor 110 is parallel to the horizontal plane. Details of this step will be described later.

(FIG. 3: Step S102)

The user lets the work machine start running. The acceleration acquiring section 121 acquires a measured result by the acceleration sensor 110 from a timepoint that is slightly before the work machine starts running. The acceleration acquiring section 121 stores a history of the measured result into the storing section 130.

(FIG. 3: Step S103)

The correcting section 122 corrects the acceleration data so that the initial value of the acceleration data is 0 acceleration. Details of this step will be described later.

(FIG. 3: Step S104)

The maximum running speed analyzing section 125 identifies, among the history of acceleration data, a running period where the work machine is running. The maximum running speed analyzing section 125 extracts acceleration data from the identified running period. Details of this step will be described later.

(FIG. 3: Step S105)

The speed calculating section 123 calculates the running speed of the work machine using the acceleration data within the running period. Since the acceleration data includes many noise components, the filtering section 124 may perform filtering process onto the acceleration data. When using a Kalman filter described later, the running speed is calculated during the filtering process. Thus the filtering process can be integrated with calculating the running speed. When using other filters, these processes may be individually performed.

(FIG. 3: Step S106)

The maximum running speed analyzing section 125 detects the change point where the work machine transits from an accelerating state into a constant speed running state. Details of this step will be described later.

(FIG. 3: Step S107)

The maximum running speed analyzing section 125 calculates, as the maximum running speed, a time average of running speed within a predetermined time range from the change point. For example, the maximum running speed may be a time average within 1 second range from the change point. The outputting section 126 outputs the maximum running speed.

Figure 4:
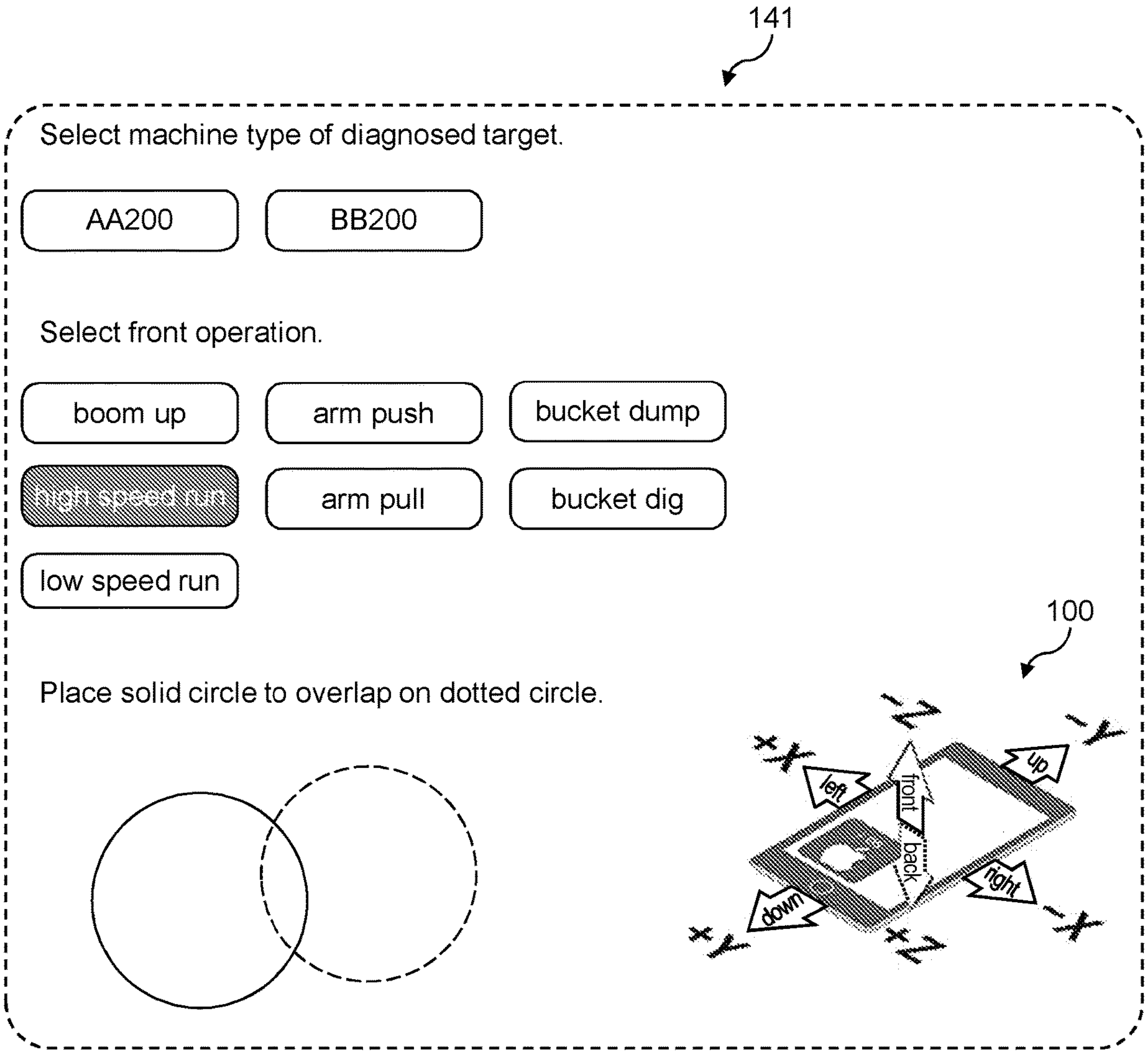
FIG. 4 is a diagram that explains a specific example of S101.

FIG. 4 is a diagram that explains a specific example of S101. The displaying section 140 displays an install confirming screen 141 as illustrated in FIG. 4. The user selects, on the screen, a machine type of the work machine or a measured operation (i.e. running). The processor 120 further acquires an inclination between the acceleration sensor 110 (i.e. speed measuring device 100) and the horizontal plane based on the measured result by the acceleration sensor 110. The processor 120 displays an image indicating the inclination on the install confirming screen 141.

FIG. 4 shows an example where a dotted circle is shown as representing the horizontal plane, and a solid circle is shown as a plane (e.g. XY plane shown at right portion of FIG. 4) encompassing two detection axes of the acceleration sensor 110. When the user changes the installed angle of the acceleration sensor 110, the solid circle moves according to the changed install angle on the screen. When the XY plane matches with the horizontal plane, the processor 120 displays each figure in the screen so that the two circles overlap with each other. Accordingly, the user can appropriately install the speed measuring device 100. The figures are one example, and other figures may be employed such as rectangles in accordance with the shape of mobile terminal, for example.

If the acceleration sensor 110 is configured by a gyro sensor, it is possible to acquire acceleration vectors in any direction using synthesizing calculation without depending on the installed angle of the acceleration sensor 110. Thus S101 may be omitted in this case. Further, in the install confirming screen 141, instead of the figure representing the installed angle, a message may be displayed that prompts to place the speed measuring device 100 on an appropriate place of the work machine (it may not be horizontal).

Figure 5:
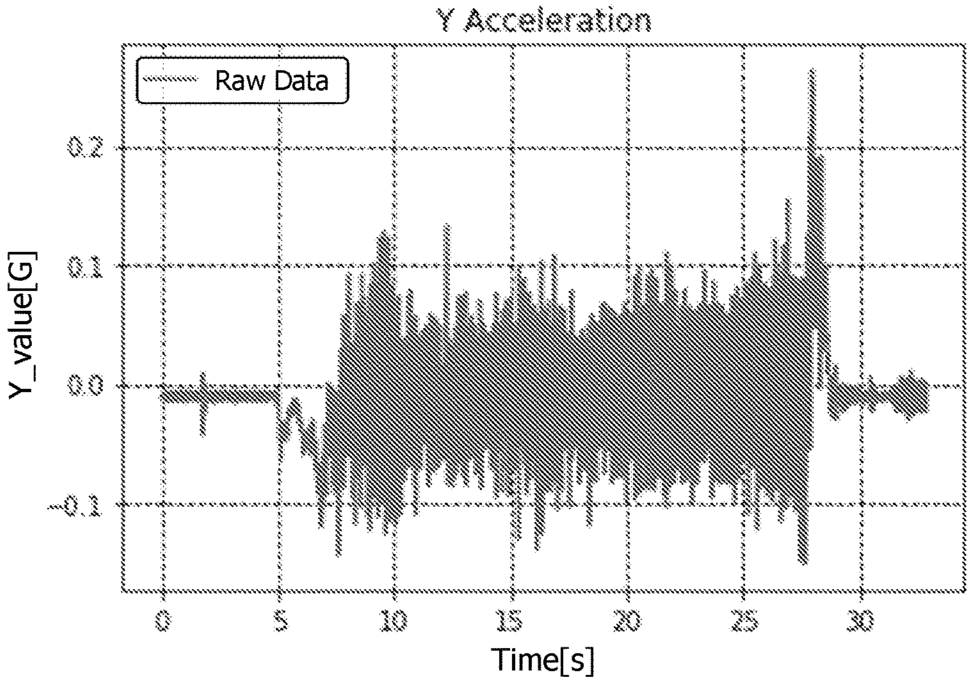
FIG. 5 is a diagram that explains a specific example of S103.
Figure 5:
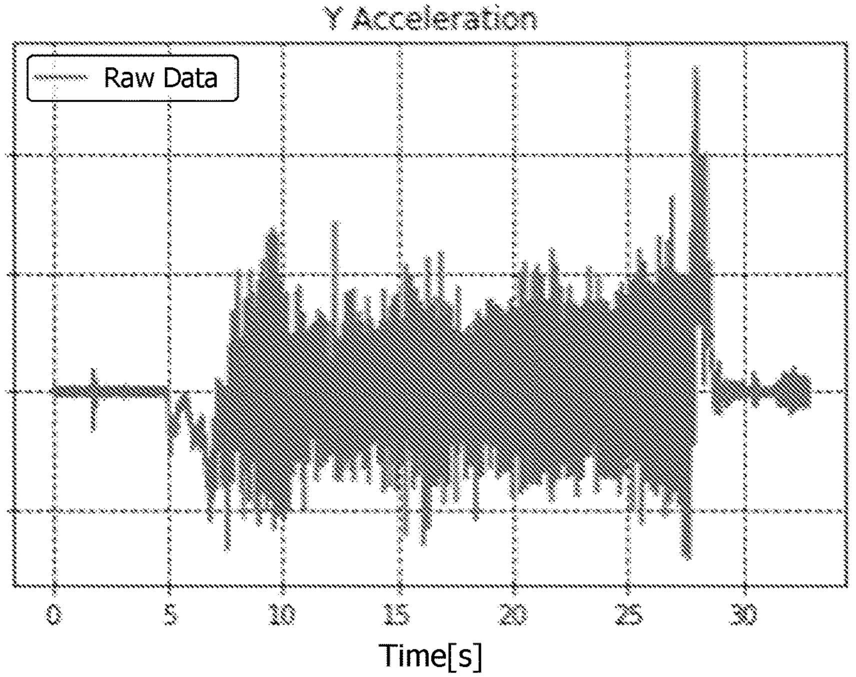

FIG. 5 is a diagram that explains a specific example of S103. When the work machine is stopped, the acceleration is assumed to be 0. Then the correcting section 122 corrects the acceleration data so that the initial value of the acceleration data is 0 acceleration. For example, the overall measured values are offset such that an average of acceleration within a predetermined time (e.g. 2 seconds) from when the acceleration sensor 110 starts measuring is 0.

Figure 6A:
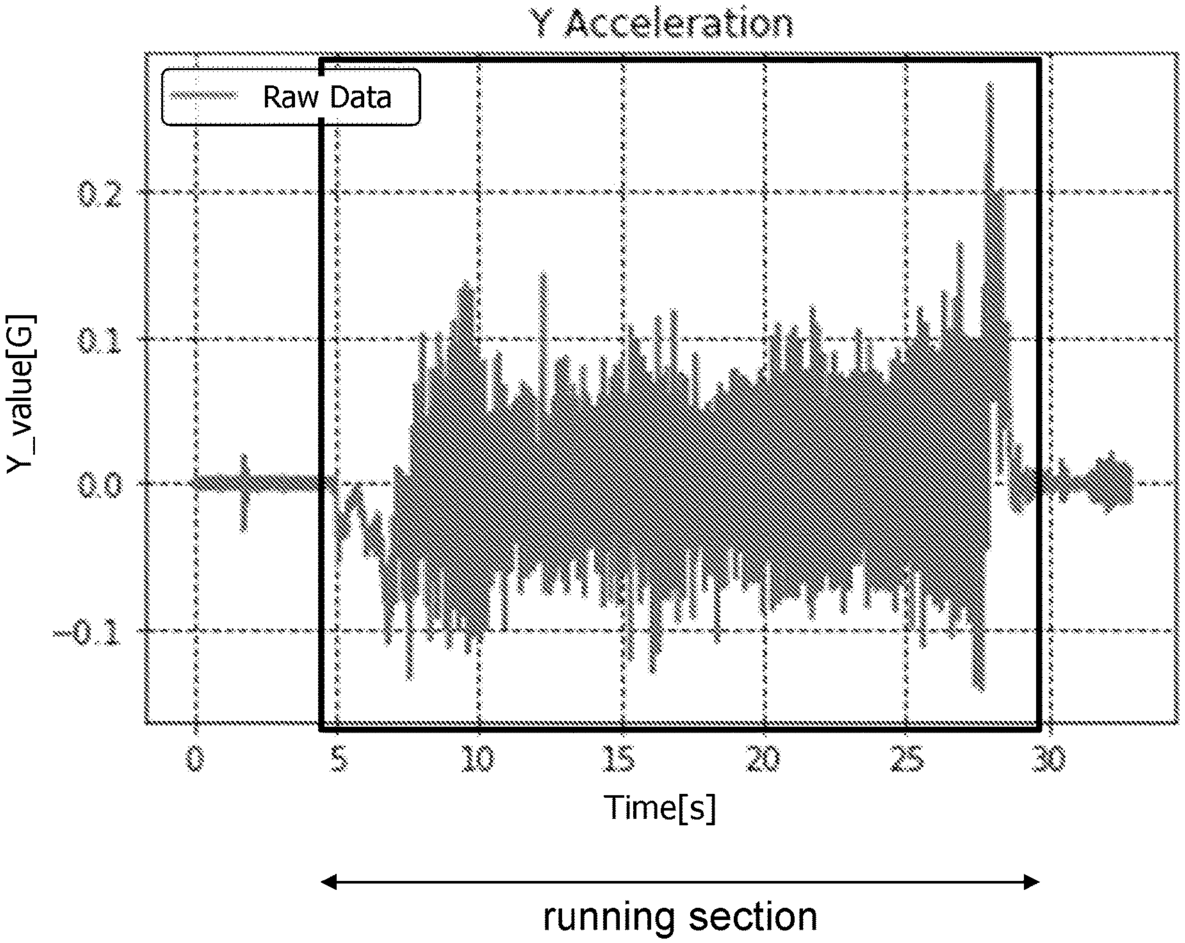
FIG. 6A is an example of running period identified in S104.

FIG. 6A is an example of running period identified in S104. Even when the work machine is not running, the acceleration may significantly vary instantaneously. The variation around the timepoint of 2 second in FIG. 6A is one of such examples. It is enough to identify the maximum running speed of the work machine within the running period. The acceleration data in other periods is not necessary. If the acceleration data includes instantaneous variations such as that of the timepoint of 2 second, the determination accuracy may be rather degraded. Thus the running period is identified in S104.

Figure 6B:
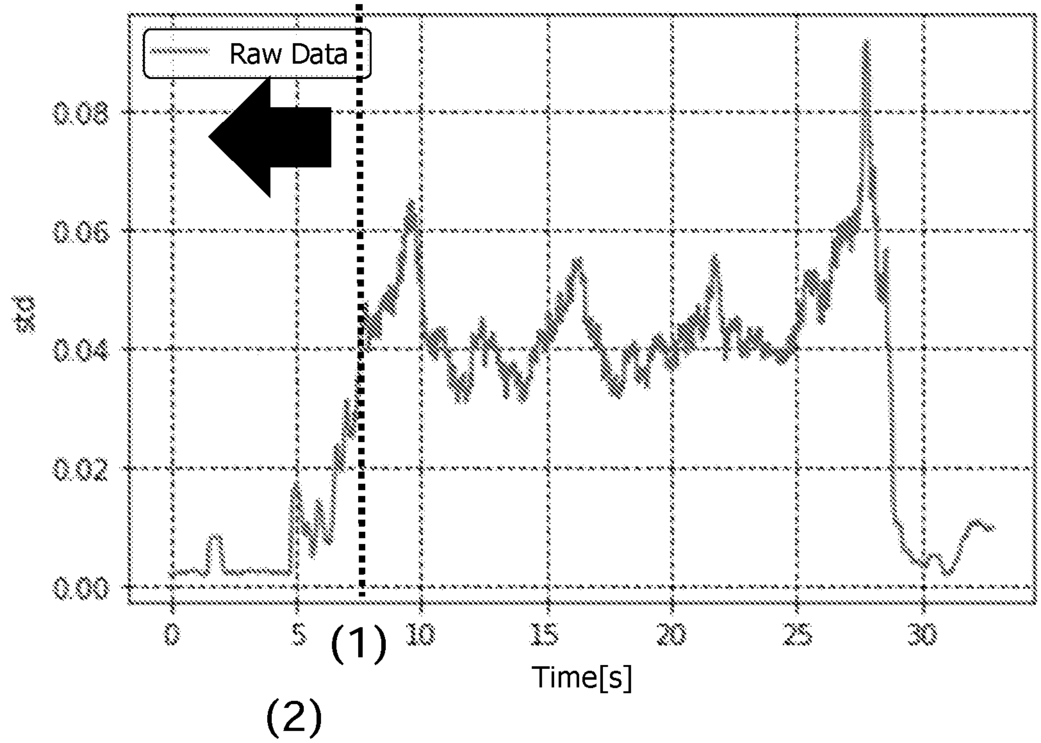
FIG. 6B is a diagram that explains a specific processing procedure in S104.
Figure 6B:
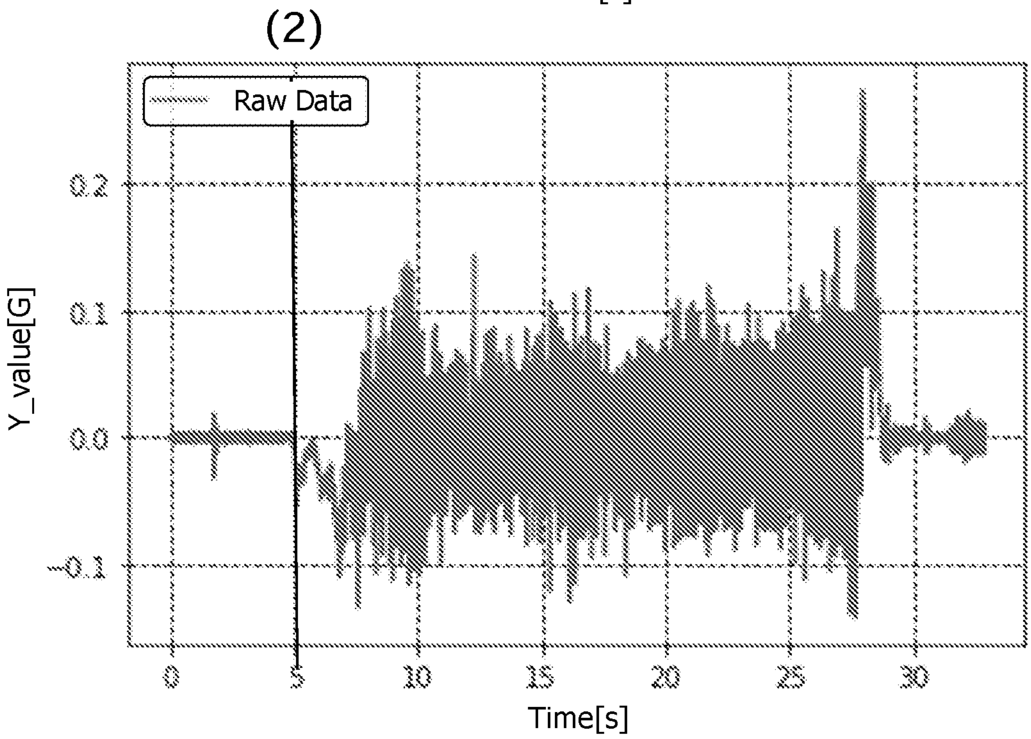

FIG. 6B is a diagram that explains a specific processing procedure in S104. The acceleration significantly varies in the running period. Thus it is assumed that the standard deviation of acceleration before or after each measured point in the running period is sufficiently large. Then the maximum running speed analyzing section 125 calculates standard deviations of a plurality of measured points in series, for each of measured points of acceleration data. FIG. 6B upper diagram shows an example of such standard deviations. The maximum running speed analyzing section 125 identifies, as a first time (time (1) in FIG. 6B), a timepoint where the standard deviation firstly reaches at or above a threshold (e.g. 0.06), counting from the start of measuring the acceleration data. After the first time, it can be assumed that the work machine at least starts running.

In order to use Kalman filter described later, it is desirable to give a precise initial value of acceleration to the filter. This is because, if the initial value is not precise, the accuracy of filtering process will be decreased. Thus the maximum running speed analyzing section 125 identifies a precise start timepoint of the running period by the procedure below.

The maximum running speed analyzing section 125 identifies, as a second time (time (2) in FIG. 6B), an initial timepoint where an absolute value of acceleration is sufficiently small (e.g. at or below a threshold 0.0001), scanning backwardly from the first time. When scanning the time axis backwardly, it is assumed that an initial timepoint where an absolute value of acceleration is sufficiently small is a timepoint when the work machine starts running. Then the maximum running speed analyzing section 125 identifies the second time as a starting timepoint of the running period. The second time can be used as an initial value of Kalman filter (and also as a precise starting timepoint of the running period).

FIG. 7A is an example of Kalman filter equation used by the filtering section 124 in S105. The state equation may be described, using a running speed of work machine at the time when a small time has elapsed from a previous time, and also using an acceleration at the time when the small time has elapsed. In the light that the actually measured value is the acceleration only, the observation equation may be described using the (actually measured value of) acceleration. Therefore, the Kalman filter equation may be described as in FIG. 7A.

Figure 7B:
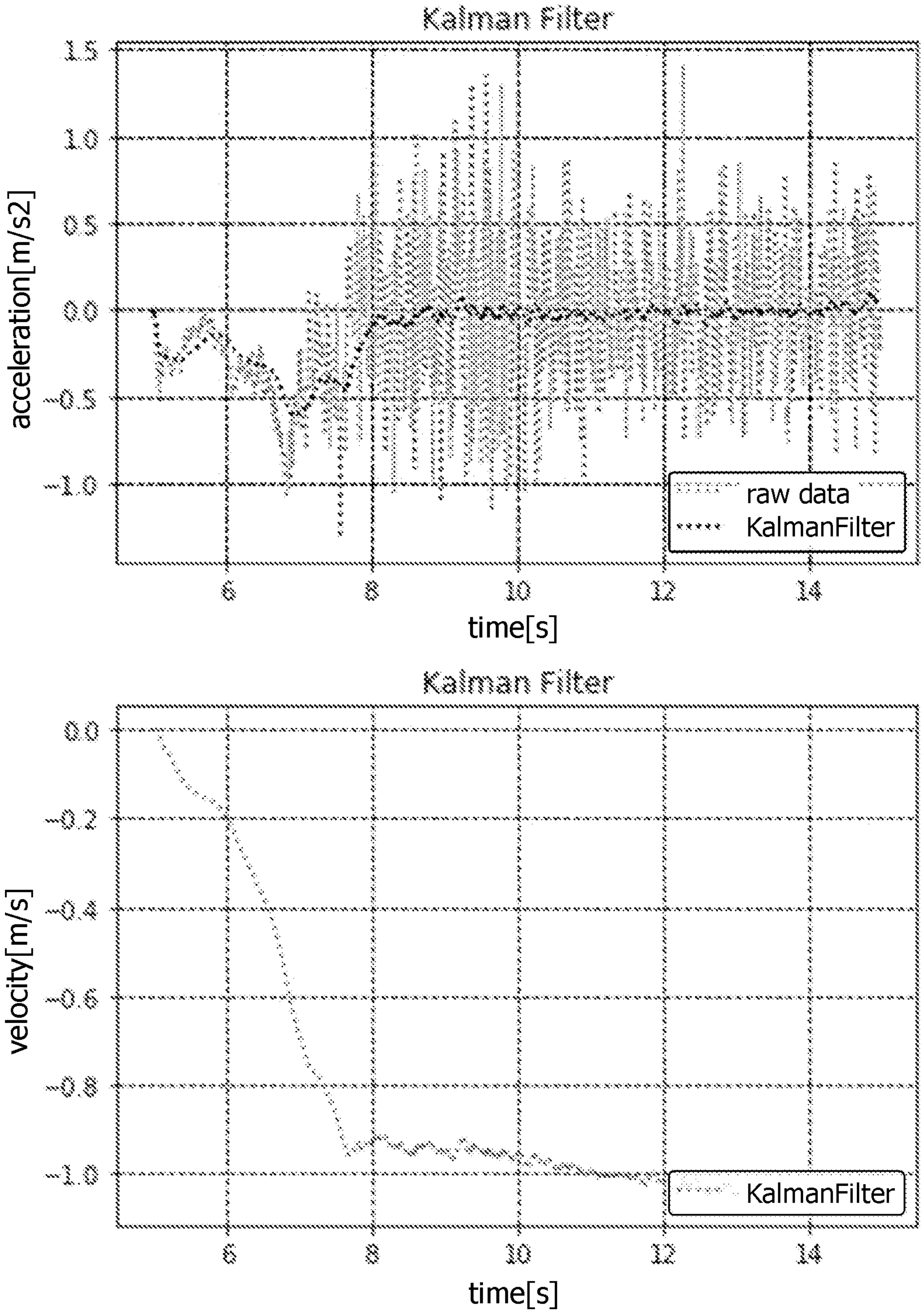
FIG. 7B is a graph that illustrates an example of filtering result.

FIG. 7B is a graph that illustrates an example of filtering result. The filtering section 124 performs a filtering step in accordance with the equation in FIG. 7A. Accordingly, as shown in the upper diagram of FIG. 7B, it is possible to decrease noises included in the acceleration data. Since the Kalman filter equation includes a running speed v of the work machine, the running speed of the work machine is also calculated during the filtering process. Therefore, the speed calculating section 123 can calculate the running speed using the processed result by the filtering section 124. FIG. 7B lower diagram is an example of running speed.

The filtering section 124 may use filters other than Kalman filter. For example, smoothing filter, particle filter, or extended Kalman filter may be used. If the running speed cannot be acquired during the filtering process, the speed calculating section 123 may calculate the speed by integrating the acceleration.

Figure 8:
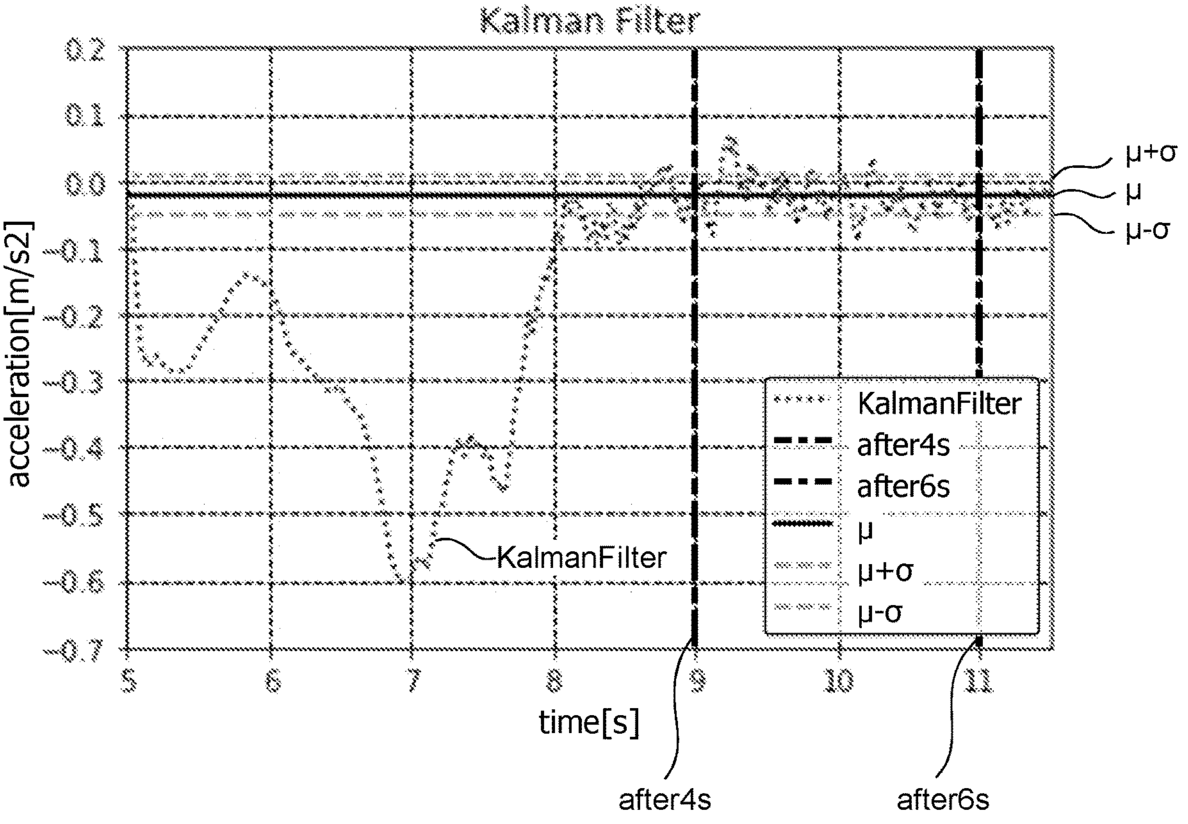
FIG. 8 is a diagram that explains a specific example in S106.

FIG. 8 is a diagram that explains a specific example in S106. Between before and after the change point where the work machine transits from accelerating state into constant speed running state, the time variation rate of acceleration may be significantly different from each other. Specifically, comparing the dispersion of acceleration in the constant speed running state with the dispersion of acceleration in the accelerating state, the latter one may be significantly larger than the former one. Thus the maximum running speed analyzing section 125 detects the change point according to the procedure below.

"KalmanFilter" in FIG. 8 shows an acceleration acquired by the filtering process above. It is assumed that the running period starts at the timepoint of 5 second in FIG. 8. The procedure below will be performed on the timepoint where 4 seconds have elapsed (9 second in FIG. 8, shown as after 4 s) from the timepoint of 5 second, and also on the timepoint where 6 seconds have elapsed (11 second in FIG. 8, shown as after 6 s) from the timepoint of 5 second. $\mu\pm\sigma$ is as described below.

The maximum running speed analyzing section 125 calculates an average $\mu$ and a dispersion a for the acceleration acquired by the filtering (shown as KalmanFilter in FIG. 8), during a period from a third time (9 second in FIG. 8) after the starting timepoint of running period to a fourth time (11 second in FIG. 8) further after the third time. Specifically, the average is calculated by calculating a time average of acceleration at each sampling time in the period of 9 second to 11 second in FIG. 8. Then the dispersion a is calculated using a difference between the average and the accelerations at each sampling time in the same period. The third time may be determined according to an empirical value at which the work machine is assumed to arrive the constant running speed state. In the example of FIG. 8, it is assumed that the work machine arrives the constant running state when at least 4 seconds have elapsed after the work machine starts running. The timepoint when the work machine is assumed to arrive the constant speed running state is employed as the third time.

The maximum running speed analyzing section 125 searches, scanning backwardly from the third time (9 second in time axis), an initial measuring point where the acceleration deviates $\mu \pm 3\sigma$. In FIG. 8, the acceleration at 9 second in time axis is around the average. The maximum running speed analyzing section 125 scans the temporal variation of acceleration from this time point backwardly, thereby identifying a timepoint when the acceleration significantly deviates from the average (i.e. timepoint when the acceleration reaches over the range of $\mu \pm 3\sigma$). This initial deviating timepoint may be employed as the change point. $3\sigma$ has a role as a threshold for detecting the change point. It is not always necessary that the threshold is $3\sigma$. The threshold may be other appropriate values.

Embodiment 1. Summary

The speed measuring device 100 according to the embodiment 1 detects a change point where the work machine transits from an accelerating state into a constant running speed state, and identifies a maximum running speed using a history of running speed after the change point. By detecting the change point, it is possible to precisely identify a timepoint when the work machine transits into the constant running speed state, without depending on the work machine or on characteristic of driver. Accordingly, the speed measuring device 100 does not need to keep redundant time margin for identifying the running period. Thus it is possible to suppress accumulation of errors.

The speed measuring device 100 according to the embodiment 1 stores, into the storing section 130, the acceleration data acquired during the running process of the work machine. The speed measuring device 100 measures the maximum running speed of the work machine using the stored acceleration data. Accordingly, it is possible for the measuring operator to confirm a test result at any timing. For example, such configuration is useful if the measuring environment is not suitable for detailed tasks.

Embodiment 2

The embodiment 1 explains a configuration where the measured result by the acceleration sensor 110 is stored into the storing section 130, and where the maximum running speed of the work machine is identified using the stored acceleration data. An embodiment 2 of the present disclosure explains a configuration example where the measured result is repeatedly acquired from the acceleration sensor 110 at each time interval, and where it is determined whether the work machine reaches the maximum running speed at each of the acquisitions. The configuration of the speed measuring device 100 is same as that of the embodiment 1.

Figure 9:
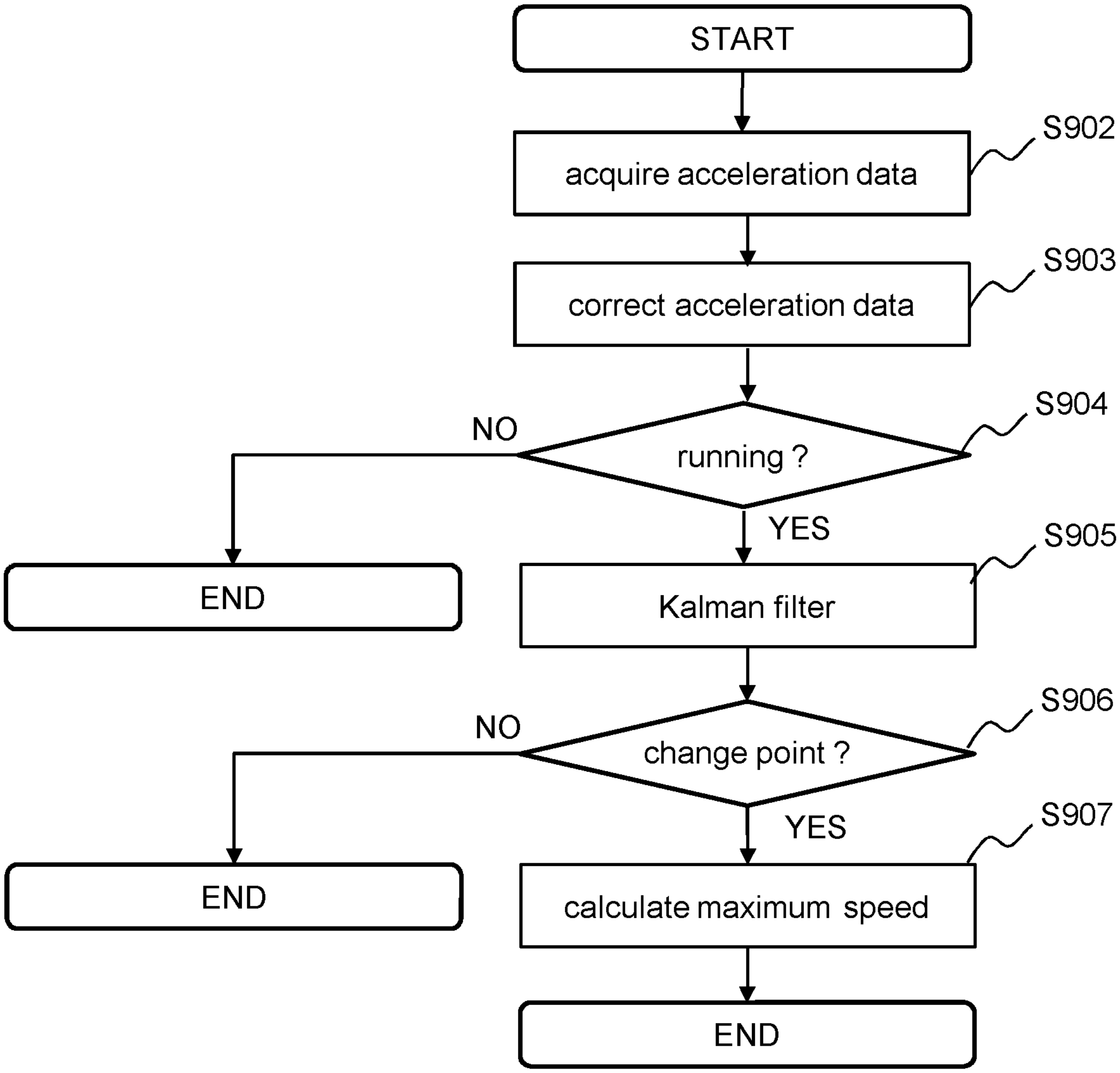
FIG. 9 is a flowchart that explains a procedure for the processor 120 to calculate a maximum running speed of the work machine in an embodiment 2.

FIG. 9 is a flowchart that explains a procedure for the processor 120 to calculate a maximum running speed of the work machine in the embodiment 2. The processor 120 performs this flowchart at each of predetermined time intervals. The process corresponding to S101 is assumed to be already performed. Hereinafter, each step in FIG. 9 will be described.

(FIG. 9: steps S902-S903)

These steps are same as S102-S103. However, this flowchart is performed at each predetermined time interval. Thus the measured result acquired in S902 is that of one measurement (one measured point).

(FIG. 9: Step S904)

The maximum running speed analyzing section 125 calculates standard deviations at a plurality of newest measured points (e,g, 50 measured points). If the standard deviation reaches at or above a threshold (e.g. 0.06), it is assumed that the work machine reaches the running period. This corresponds to identifying the first time in S104. The embodiment 2 determines whether the work machine reaches the maximum running speed every time when acquiring the measured result. Thus the process for identifying the second time in S104 is omitted. This means that the processing time is prioritized considering the tradeoff between the accuracy and the processing time. If the work machine has not reached the running period, or if a required number of measured points has not been acquired yet, this flowchart will be terminated.

(FIG. 9: Step S905)

This step is same as S105. However, this flowchart is performed at each of acquiring the measured result. Thus the process in this step performs the filtering process onto the acceleration data of a latest one of timepoints.

(FIG. 9: Step S906)

The maximum running speed analyzing section 125 calculates an average of a plurality of newest measured points (e.g. 50 measured points). The maximum running speed analyzing section 125 compares an average calculated last time with an average calculated this time. When a difference between those averages reaches a threshold (when the acceleration converges and the time variation rate has become sufficiently small at or below a threshold), the maximum running speed analyzing section 125 assumes to reach the change point. If not reaching the change point, this flowchart will be terminated.

(FIG. 9: Step S907)

The maximum running speed analyzing section 125 acquires acceleration data at or after the change point. The maximum running speed analyzing section 125 calculates a maximum running speed as in S107.

Embodiment 2: Summary

The speed measuring device 100 according to the embodiment 2 acquires acceleration of the work machine at each time interval. The speed measuring device 100 determines whether the work machine reaches the maximum running speed at each ones of the time intervals. Accordingly, it is possible to shorten, below conventional techniques, the distance necessary for the work machine to measure the running performance.

The embodiment 2 may use appropriate alarming means in order to notify a user that the work machine reaches the maximum running speed. For example, voice notification, notification in conjunction with other device, or vibrating notification may be assumed. Accordingly, the worker can immediately identify that the test has completed even if the testing environment is not quiet.

Embodiment 3

Figure 10:
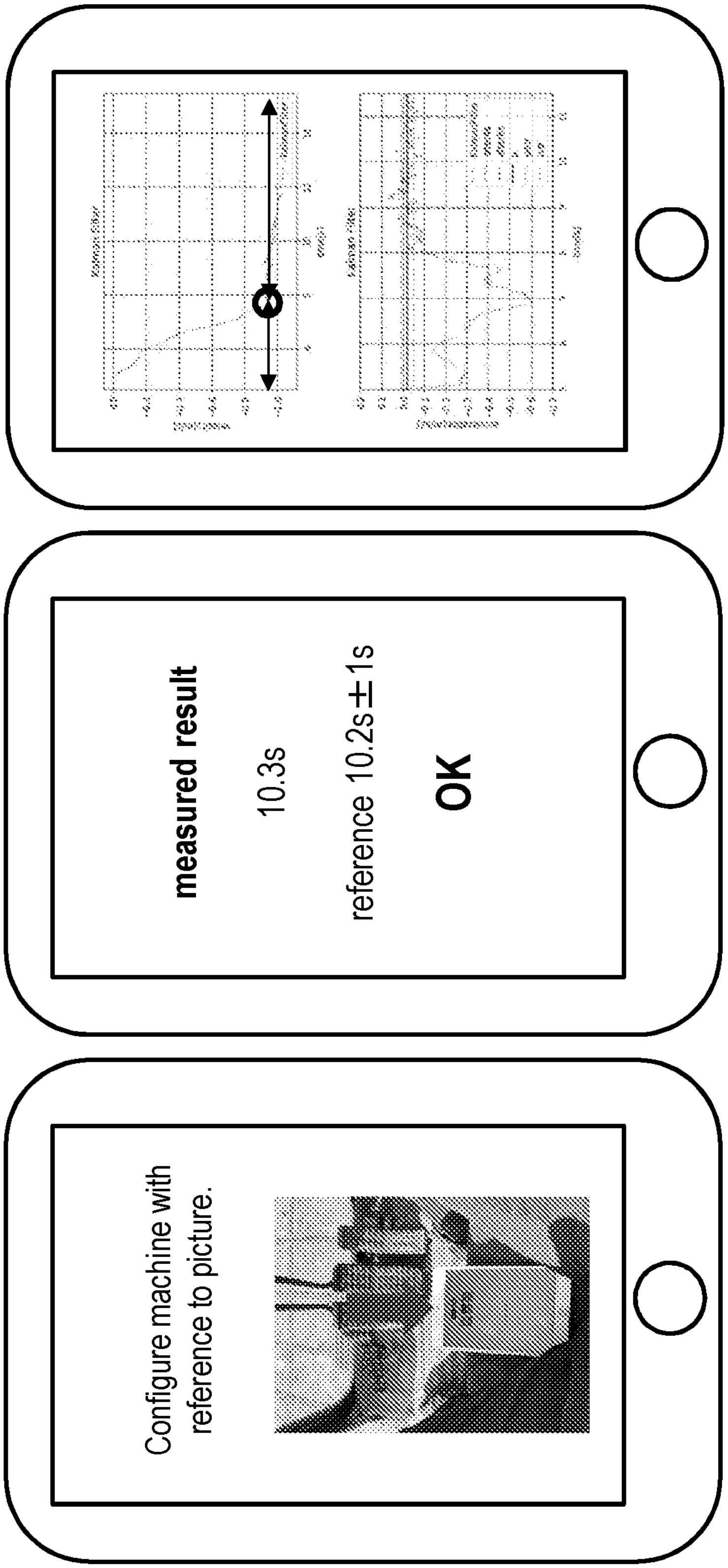
FIG. 10 is an example of user interface displayed by a displaying section 140.

FIG. 10 is an example of user interface displayed by the displaying section 140. The displaying section 140 can provide a user interface as below in addition to the install confirming screen 141.

It is desirable that the speed measuring device 100 is installed so that any one of the measuring axes of the acceleration sensor 110 is parallel to the moving direction of the work machine. Then the storing section 130 may previously store an image captured when the speed measuring device 100 is appropriately installed on the driver's sheet of the work machine. The install confirming screen 141 (or other screens presented in S101) may display the captured image showing an install example. FIG. 10 left diagram is such an example. FIG. 10 only shows an appropriate install example in the install confirming screen. However, the install confirming screen is not limited to such display, and may also display inappropriate install examples simultaneously. Accordingly, it is possible to surely understand the appropriate install example.

The maximum running speed identified by the processor 120 may be displayed on the displaying section 140. A standard maximum running speed may also be displayed simultaneously. The standard maximum running speed may be stored in the storing section 130 in advance. FIG. 10 center diagram shows such a display example. The displayed content may be arbitrarily configured. For example, the displaying section 140 may only show "measured result" and "OK". The displayed order is not limited to this example. For example, the measured result is followed by "OK", and the maximum running speed or the standard maximum running speed may be displayed below "OK". In a case of "NG", the displaying section 140 may also show that there is an abnormality, or may also show a handling manual for abnormality of running speed.

The displaying section 140 may also show a history of acceleration, standard deviation, or speed that are used by the processor 120 in the process of performing FIG. 3 or FIG. 9. In addition, the displaying section 140 may also show an identified result such as the change point. FIG. 10 right diagram shows an example of a graph displaying a change point and a running period in the speed history, and of showing FIG. 8. This display may be arbitrarily shown. In such cases, the display may be switched by swiping the display section in FIG. 10 center diagram, or by providing a tab such as "details" and selecting the tab. The displayed graphs or figures may be any one of them only. The graphs or figures may be enlarged or shrunk by pinch-in or pinch-out operation onto the displaying section. By configuring these displays, it is possible to appropriately control the necessary information depending on priority or urgency.

Modification of Present Disclosure

The present disclosure is not limited to the embodiments as described above, but includes various modifications. For example, the embodiments are described in detail for readily understanding of the present disclosure which is not necessarily limited to the one equipped with all structures as described above. It is possible to replace a part of the structure of one embodiment with the structure of another embodiment. The structure of one embodiment may be provided with an additional structure of another embodiment. It is further possible to add, remove, and replace the other structure to, from and with a part of the structure of the respective embodiments.

In the embodiments above, it is not always necessary for the speed measuring device 100 to include the acceleration sensor 110. The processor 120 may acquire, via such as communication, a result measuring an acceleration applied to the work machine.

REFERENCE SIGNS LIST

100: speed measuring device
110: acceleration sensor
120: processor
130: storing section
140: displaying section

The invention claimed is:

1. A speed measuring device that is installed on a work machine and that measures a running speed of the work machine, comprising:
- an acceleration sensor that measures an acceleration of the work machine and that outputs a measured result as acceleration data;
- a processor;
- a memory coupled to the processor:
- wherein the memory stores instructions that when executed by the processor, configures the processor to:
- acquire a running acceleration of the work machine by calculating an acceleration in a running direction of the work machine based on an outputted result of the acceleration data from the acceleration sensor;
- calculate a running speed of the work machine by integrating data of the running acceleration;
- calculate a maximum running speed of the work machine from a history of the running speed; and
- output the maximum running speed,
- wherein the processor is configured to:
  - detect, by calculating a temporal variation of running acceleration in a history of the data of running acceleration, a change point where the work machine transits from an accelerating state into a constant speed running state, and
- calculate the maximum running speed from a history of the running speed in a period after the change point.

2. The speed measuring device according to claim 1, further comprising a display that presents information representing an angle between a detection axis of the acceleration sensor and a horizontal plane, thereby prompting to place the acceleration sensor in parallel to the horizontal plane.

3. The speed measuring device according to claim 2,
- wherein the processor is configured to display data on a screen of the display that prompts a user to place the acceleration sensor so that a first figure representing the horizontal plane overlaps with a second figure representing a plane encompassing the detection axis.

4. The speed measuring device according to claim 1, further comprising the processor being configured to correct a history of the data of running acceleration so that the running acceleration when the work machine is stopped is 0.

5. The speed measuring device according to claim 4,
- wherein the processor is further configured to shift a history of the data of running acceleration so that an average value of the running acceleration is 0 in a period from when the acceleration sensor starts measuring the running acceleration to when a predetermined time has elapsed, thereby correcting a history of the data of running acceleration.

6. The speed measuring device according to claim 1, wherein the processor is configured to:

scan a history of the data of running acceleration backwardly from a first timepoint after the work machine starts running to identify a second timepoint when an absolute value of the running acceleration reaches at or below a threshold, thereby extracting the running acceleration in a running period where the work machine is running, and calculate the maximum running speed from a history of the running speed in the running period.

7. The speed measuring device according to claim 6, wherein the processor is configured to:

calculate, for each of measured points of the running acceleration, a standard deviation of the measured point using another measured point at least before or after the measured point, identify, as the first timepoint, an initial one of the measured point where the standard deviation is at or above a first threshold after the work machine starts running, and scan backwardly from the first timepoint to identify, as the second timepoint, an initial one of the measured point where the running acceleration reaches a second threshold.

8. The speed measuring device according to claim 1, further comprising the processor being configured to:

filter an error of the running acceleration, and calculate the maximum running speed from a history of the data of running acceleration after performing the filtering.

9. The speed measuring device according to claim 8, wherein the processor is configured to:

filter the error by applying a Kalman filter to the running acceleration, wherein the Kalman filter is configured by describing a state equation using the running speed at a timepoint when a small time has elapsed and also using the running acceleration at a timepoint when the small time has elapsed, and by describing an observation equation using the running speed and an actually measured value of the running acceleration, and use, as a running speed of the work machine, the running speed that is acquired in a process of filtering the error using the Kalman filter.

10. The speed measuring device according to claim 1, wherein the processor is configured to:

calculate, as a calculation of temporal variation of the running acceleration, an average of the running acceleration and a dispersion of the running acceleration in a period from a third timepoint to a fourth timepoint after the work machine starts running, and scan from the third timepoint backwardly to identify, as the change point, an initial measured point where an absolute difference between the running acceleration and the average is at or above a threshold.

11. The speed measuring device according to claim 10, wherein the processor is configured to:

scan from the third timepoint backwardly to identify, as the change point, an initial measured point where an absolute difference between the running acceleration and the average is at or above three times of the dispersion.

12. The speed measuring device according to claim 1, further comprising a storing section that stores a history of the data of running acceleration, wherein the processor is configured to calculate the maximum running speed from a history of the running speed stored in the storing section.

13. The speed measuring device according to claim 1, wherein the processor is configured to:

repeatedly acquire, from the acceleration sensor, the acceleration data indicating a measured result of the running acceleration at each time interval, acquire a predetermined number of a most recent measured point of the running acceleration, calculate a standard deviation of the predetermined number of the measured point, determine, for each of the time interval, whether the work machine reaches a running period where the work machine is running, according to whether the standard deviation is at or above a threshold, and calculate the maximum running speed from a history of the running speed in the running period.

14. The speed measuring device according to claim 1, wherein the processor is configured to:

repeatedly acquire, from the acceleration sensor, the acceleration data indicating a measured result of the running acceleration at each time interval, acquire a predetermined number of a most recent measured point of the running acceleration, and determine, as a calculation of temporal variation of the running acceleration, whether a time variation of an average of the predetermined number of the measured point is below a threshold for each of the time interval, thereby determining whether the work machine reaches the change point for each of the time interval.

15. The speed measuring device according to claim 1, wherein the processor is configured to measure the running speed of the work machine that cannot run at a speed at or above a predetermined range above or below the maximum running speed.

* * * * *